Oct. 10, 1967     F. M. WOOD ETAL     3,346,807
RECIPROCATING APPARATUS WITH MEANS TO MAINTAIN THE
RECIPROCATION CENTERED OVER AN ANOMALY
Filed April 24, 1964                                    4 Sheets-Sheet 1

Fenton M. Wood
Alfred E. Crouch
William T. Walters
INVENTORS

BY *Arnold and Roylance*

ATTORNEYS

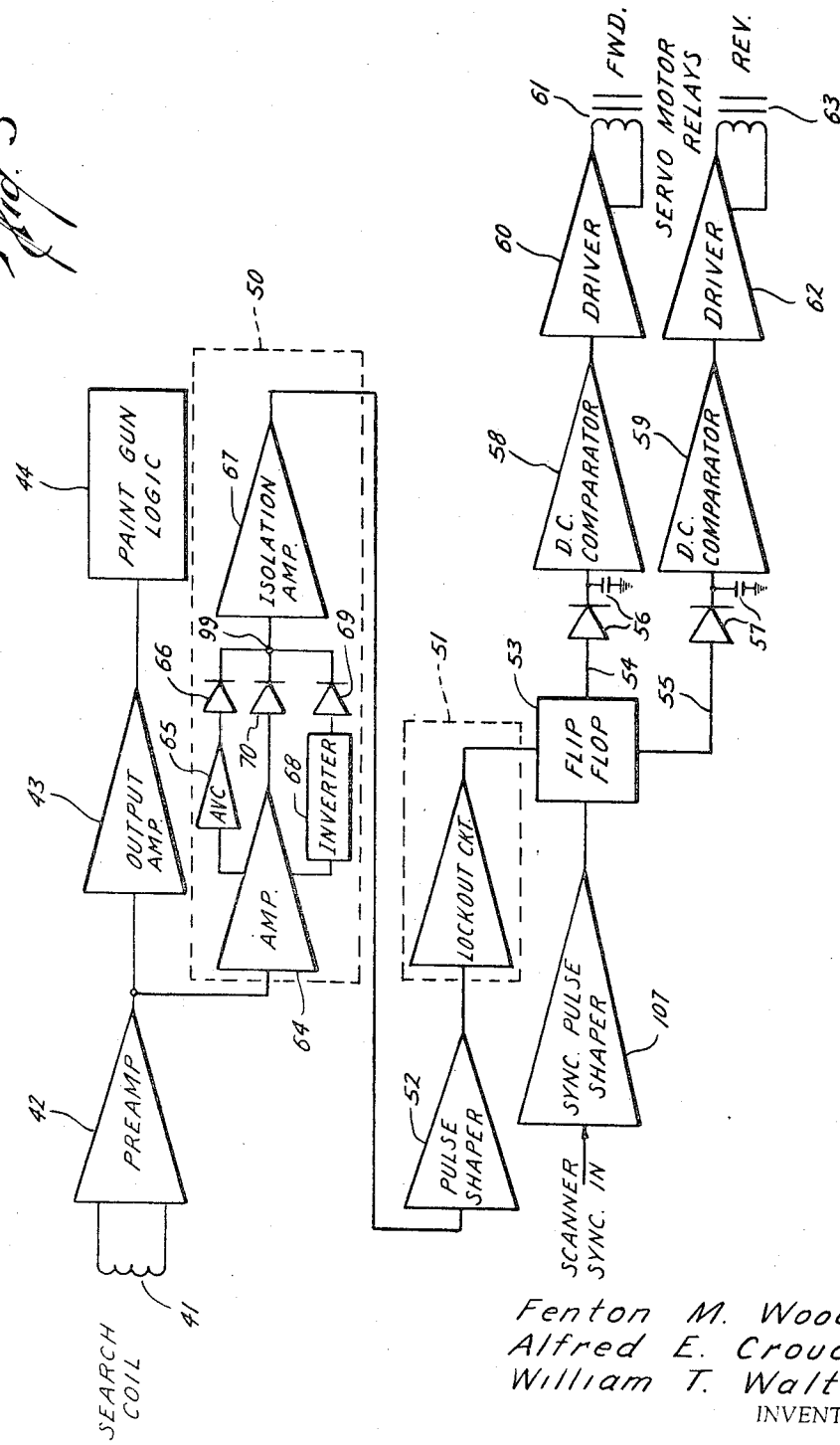

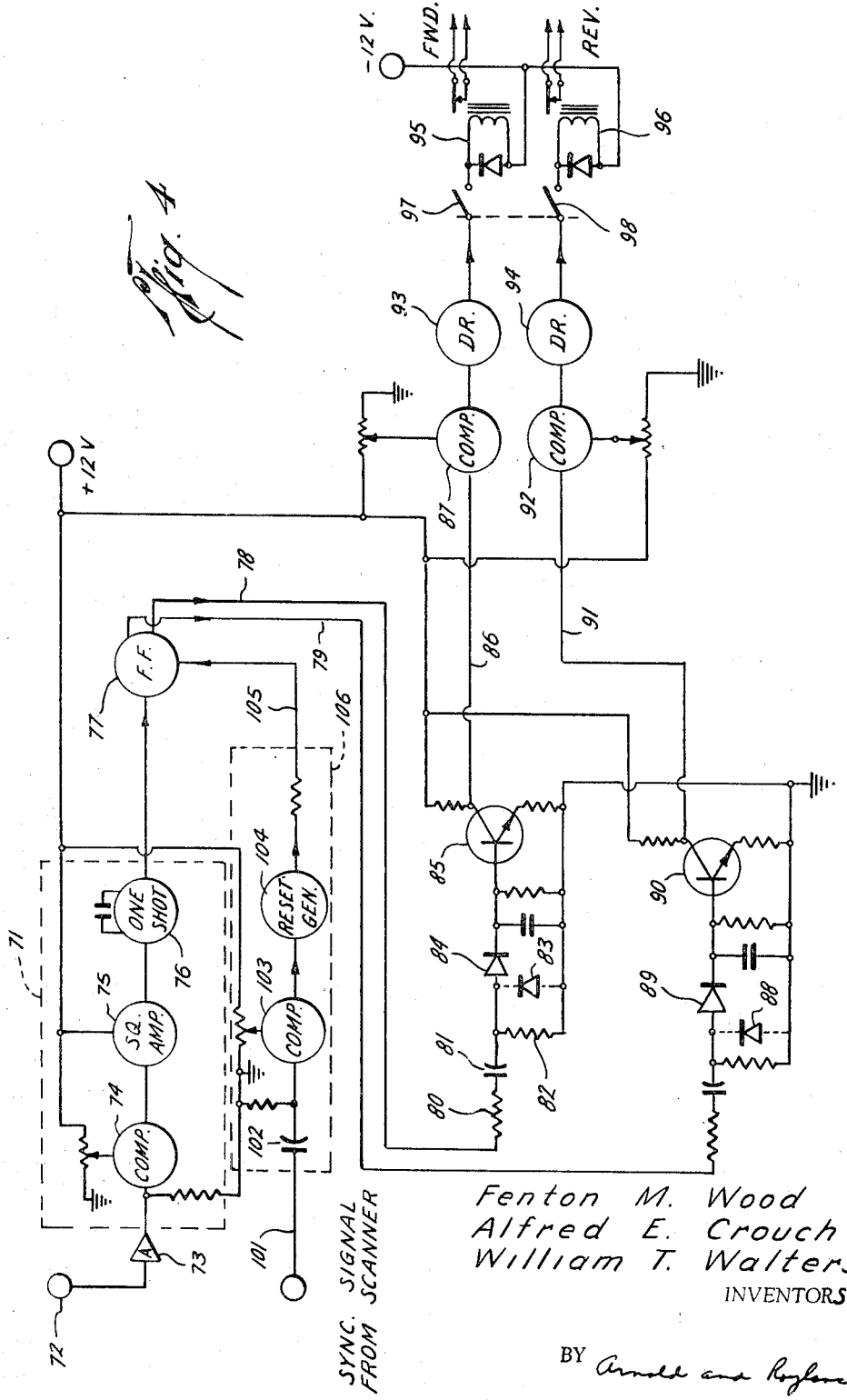

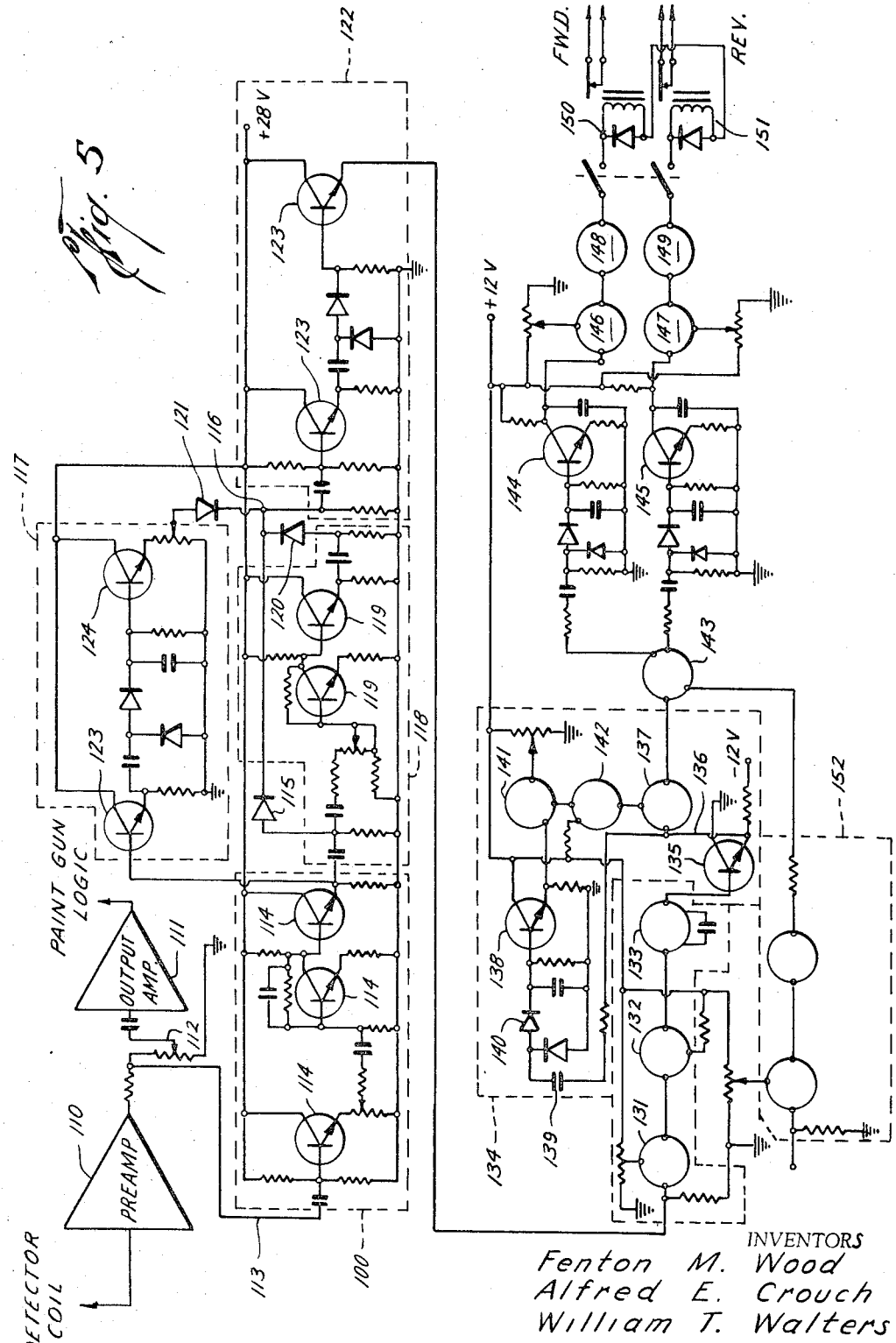

United States Patent Office 3,346,807
Patented Oct. 10, 1967

3,346,807
RECIPROCATING APPARATUS WITH MEANS TO MAINTAIN THE RECIPROCATION CENTERED OVER AN ANOMALY
Fenton M. Wood, Sugarland, and Alfred E. Crouch and William T. Walters, Houston, Tex., assignors to American Machine & Foundry Company, New York, N.Y., a corporation of New Jersey
Filed Apr. 24, 1964, Ser. No. 362,314
15 Claims. (Cl. 324—37)

ABSTRACT OF THE DISCLOSURE

Apparatus for uniformly oscillating a magnetic detection means or other work means over an anomaly such as a weld line in a generally longitudinal member such as pipe as the pipe is moved relative to the detection means and apparatus. A signal occasioned by the weld line is used to uniformly position the work means during camber of the weld line. The apparatus includes a movable frame for supporting the work means and means for imparting to the work means a generally sinusoidal motion with respect to the weld line. Electrical circuit means responsive to the signal occasioned by the weld line operates a servo motor to maintain the work means and apparatus over the weld line. Lockout circuit means may be included to deactivate the tracking system when the signals are not present or are of too low amplitude to operate properly.

This invention relates to a unique anomaly tracking apparatus to be used in combination with an apparatus for performing a work operation on a member having a generally elongated anomaly therein. More particularly, the invention relates to a novel tracking means on an apparatus for performing a work operation such as inspecting an elongate member. Such a member could be a pipe having a longitudinal weld line therein wherein the inspecting unit is oscillated across the weld line in a sinusoidal path, the center of which is maintained in a preselected position over the weld line even when the weld line moves in transverse directions.

In the art of electric resistance welding of tubing, it is normal for the weld line to be squarely on top of the pipe or at a twelve o'clock position. However, as the welded pipe is formed and the welded portion moved away from the welded area and down through the production line, the trimming area, and the cooling area, the weld line may on occasion rotate one way or another from the twelve o'clock position. This is generally known as weld line camber.

In many instances, it is desirable to perform a work operation along the weld line such as inspecting for defects wherein a magnetic responsive means such as a search coil is oscillated in a sinusoidal path, which path is centered over the weld line. In order to maintain the center of the path over the weld line, it is necessary that some means be provided for rotating the work means or the search coil such that it will continue to be over the weld line when the weld line cambers as described above.

In the art of magnetic inspection, it has been the usual practice to oscillate a search coil over the weld line as the pipe is moved relative thereto in an axial direction with the total length of the transverse sweep of the coil being about one inch. However, if the weld line cambers as much as two inches or thereabouts, it is obvious that the search coil would no longer be over the weld line. Hence, it was necessary to have an apparatus which would rotate or camber the search coil at the same time that the weld line cambers.

There are many examples of seam tracking transducers in the prior art but which operate on different principles than the invention provided herein and which are not as successful as the instant inventions for a number of reasons, including their complexity and tendency to malfunction.

It is therefore an objective of this invention to provide an improved apparatus for uniformly oscillating a work means over an anomaly in a generally longitudinal member which member is moved relative to the apparatus.

It is another object of this invention to provide an improved apparatus for uniformly oscillating a work means over a weld line in a pipe being formed.

It is a still further object of this invention to provide an improved apparatus for uniformly oscillating a search unit over a weld line in a pipe during manufacture of the pipe wherein a signal occasioned by the weld line is used to uniformly position the work means during camber of the pipe.

These and other objectives of the invention will be obvious to those skilled in the art by reference to the description herein and the drawings.

Briefly stated, this invention is an improvement on, and is to be used in combination with, an apparatus for performing a work operation on a magnetizable member, which member is moved relative to the apparatus and has an anomaly which extends generally parallel with the direction of said relative movement and in which the anomaly is subject to variations in directions transverse to the direction of relative movement. The apparatus has oscillation means mounted on a support for transversely oscillating the work means over the anomaly during the relative movement.

The improvement for causing the oscillation to be uniform in relation to the anomaly, including times when the anomaly varies in transverse directions, includes a movable frame which is mounted on the support means and is adapted to support the oscillation means. There is also provided means for establishing a magnetic field in a portion of the magnetizable member and through the anomaly. This magnetic field can either be the transverse type created by a magnet or it can be the eddy current type created by an eddy current coil.

Magnetic responsive means, such as a search coil or an eddy current coil, is mounted on the oscillation means such that it is oscillated over the anomaly during oscillation of the work means and produces a first voltage as an incident of each crossing of the magnetic responsive means over the anomaly.

There is connected to the magnetic responsive means a first comparator circuit which is adjusted to produce an output when the magnetic responsive means produces a voltage above a preselected level. This first voltage is then applied to a flip-flop circuit, which circuit is arranged to have two output voltages of different levels and is adapted to alternately apply these two output voltages to two leads as an incident of successive inputs from the first comparator.

Electrical circuit means are connected to the leads, which circuit means are for the purpose of averaging the output voltages received from the flip-flop circuit and applying said averaged voltages to alternately operate a motor, such as a servo motor, in forward and reverse directions when the averaged output voltages vary beyond preselected limits.

The motor is connected so as to move the movable frame transversely with respect to the anomaly. Hence, the work means is caused to follow a generally sinusoidal path, the center of which is maintained centrally over the anomaly when the motor is operated in either forward or reverse directions as the anomaly varies in transverse directions.

Reference to the drawings will further explain the invention wherein like numerals refer to like parts and in which:

FIG. 3 is a schematic diagram of one embodiment of the electrical circuit of the invention.

FIG. 4 is a detailed block diagram of one embodiment of the invention generally illustrated by FIG. 3.

FIG. 5 is a detailed diagram of another embodiment of electronic circuit of the invention and is similar to FIG. 4 but has some added improvements thereover.

Figure 1:
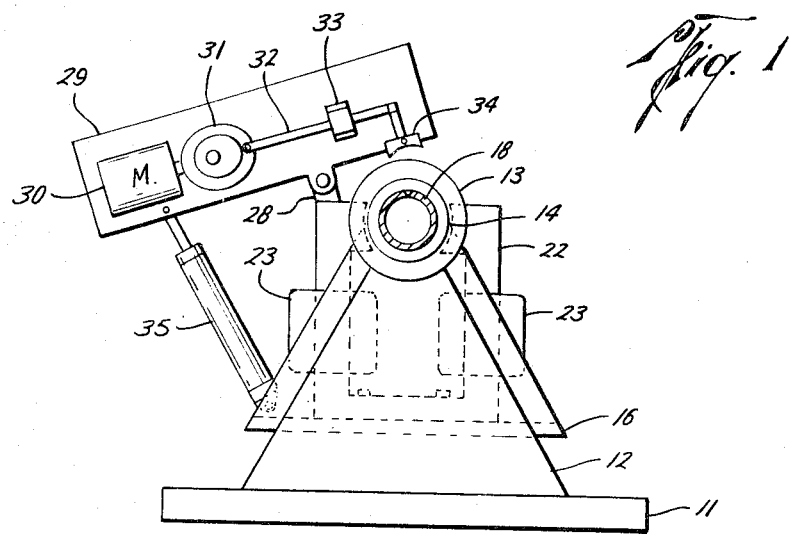
FIG. 1 is a side elevation view showing one embodiment of the rotatable frame and the oscillation means of the apparatus.
Figure 2:
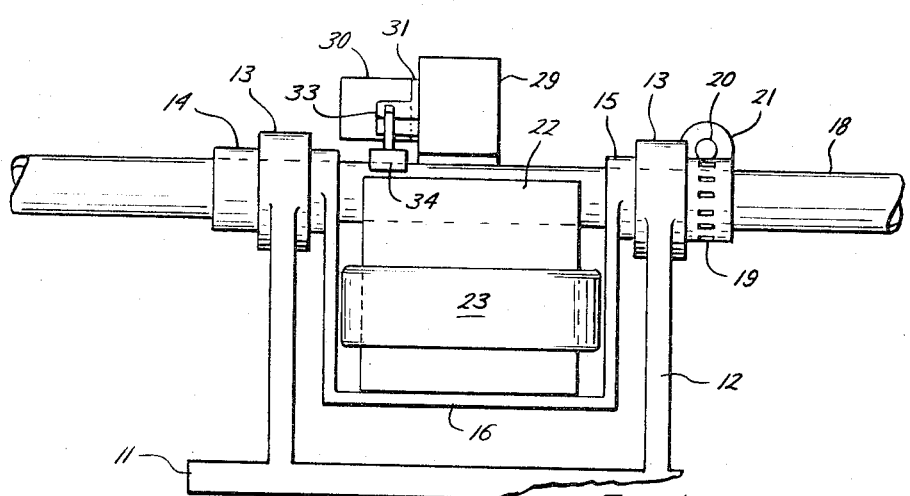
FIG. 2 is a side elevation view of the apparatus shown in FIG. 1 taken at a line 2—2 of FIG. 1.

Referring now to FIGS. 1 and 2, it will be observed that base 11 and two triangular shaped supports 12 generally form the support means. The top ends of supports 12 are each provided with annular rings 13 connected thereto and in which are mounted for rotation two annular sleeves 14 and 15 which support a U shaped rotatable or movable frame 16. Sleeves 14 and 15 are of a sufficient for pipe 18 to pass therethrough. Means (not shown) are provided for moving pipe 18 relatively through sleeves 14 and 15. The right end of sleeve 15 as viewed in FIG. 2 is formed with a plurality of depressions thereabout, thus forming a ring gear 19 which is adapted to be engaged by worm drive 20 which is operated by servo motor 21. When servo motor 21 is driven in either forward or reverse direction, worm drive 20 rotates sleeve 15 either clockwise or counter clockwise, thereby moving or rotating frame 16 circumferentially with respect to pipe 18.

Frame 16 has mounted thereon a magnet in the form of yoke 22, each arm of which is provided with a coil 23, thus forming an electromagnet. The upper ends of yoke 22 are shaped for close disposition at opposite sides of pipe 18, such that a transverse magnetic field may be passed therethrough.

The left upper member of yoke 22, as viewed in FIG. 1, is provided with lug 28 to which is pivotally secured frame 29, in which there is mounted an electric motor 30. Motor 30 drives eccentric cam wheel 31 which has an annular camming surface therein which engages the end of rod 32. Rod 32 is slideably mounted in bushing 33 and passes therethrough and connects by resilient means (not shown) to search shoe housing 34. Thus, when motor 30 is operated, search shoe housing 34 is oscillated back and forth transversely with respect to pipe 18 and in a sinusoidal wave pattern as pipe 18 is moved relative thereto. The lower end of frame 29 is connected with air cylinder 35, the lower end of which is mounted on frame 16 such that by operation of air cylinder 35, the search shoe housing 34 may be raised and lower from a searching position to a nonsearching position and vice versa.

In normal operation, pipe 18 will have the weld line formed on the upper side or 12 o'clock position thereof. Search shoe housing 34 will be oscillated back and forth in a sinusoidal path. The search shoe housing 34 has a magnetic responsive means such as a search coil (not shown) mounted therein which is responsive to variations in the magnetic field caused by the weld line. The voltage generated as an incident of the magnetic responsive means passing over the weld line is then utilized to operate servo motor 21 to turn worm drive 20 to thereby rotate ring gear 19 and movable frame 16 such that the search shoe housing 34 is repositioned so that the center of the path followed by the search shoe housing 34 will continue to be in a fixed position relative to the weld line.

Reference to FIG. 3 will further explain the operation of the electrical circuit of one embodiment of this invention. In this instance, the magnetic responsive means could be a flaw detector coil such as coil 41 which would be mounted in search shoe housing 34 for oscillation across the weld line. The voltage generated by coil 41 as it crosses the weld line is applied to preamplifier 42, the output of which is applied to two places. The output is applied to outut amplifier 43 and thence to some defect sensing logic circuit such as paint gun logic circuit 44, which could be arranged to operate paint guns to thereby spray paint on the area of the pipe containing the defect. The output of preamplifier 42 is also applied to an electrical circuit which controls the direction of operation of operation of servo motor 21 and will now be explained in detail.

FIG. 3 shows two embodiments of the electrical circuit which embodiments are further shown in FIGS. 4 and 5. In other words, FIG. 3 in its entirety is representative of the circuit shown in FIG. 5. By omitting those portions of FIG. 3 which are shown in the broken line rectangles indicated by the numerals 50 and 51, then FIG. 3 is also illustrative of the embodiment shown in FIG. 4. For purposes of simplicity, FIG. 3 will first be explained as if those portions in rectangles 50 and 51 were omitted therefrom.

Thus, it may be said that the output of preamplifier 42 is fed through pulse shaper 52, and to flip-flop circuit 53, which is designed to have two outputs of different voltages and is adapted to apply those two outputs alternately to leads 54 and 55 with successive inputs from pulse shaper 52. Leads 54 and 55 are connected to averaging circuits which are shown as circuits 56 and 57 which are respectively connected to comparators 58 and 59. Comparator 58 operates driver 60 which is connected to switch means in the form of relay 61 which operates servo motor 21 in a forward direction. Similarly, comparator 59 is connected to driver 62 which operates relay 63 which operates servo motor 21 in reverse direction.

Referring now to FIG. 4, that portion of the electrical circuit included within dotted rectangle 71 contains those portions of the circuit referred to as pulse shaper 52 in FIG. 3. Thus, the voltage generated by the search coil or other magnetic responsive means is applied to input 72 and thence to amplifier 73 which corresponds to preamplifier 42 in FIG. 3. The output of amplifier 73 is applied to comparator 74 which is set to be responsive to voltages above a preselected level. The output of comparator 74 is applied to squaring amplifier 75 which is connected to one-shot 76, the purpose of which is to provide a signal to operate flip-flop circuit 77 which as connected thereto. Flip-flop 77 corresponds with flip-flop 53 shown in FIG. 3.

Flip-flop 77 is connected to output leads 78 and 79 and is so arranged as to have two outputs of different voltage, as for example a minum 3 volts and a minus 11 volts. Flip-flop 77 is arranged to apply these two voltages alternately to leads 78 and 79 with successive inputs from one-shot 76. It will be observed that leads 78 and 79 of FIG. 4 correspond with lead 54 and 55 of FIG. 3. Lead 78 connects with an averaging circuit having resistor 80, capacitor 81, resistor 82, and diodes 83 and 84. The output of the foregoing averaging circuit is directed to the base of transistor 85.

The purpose of the averaging circuit is to provide a DC output the amplitude of which is proportional to the amount of time that minus 3 volts has been applied thereto. Hence, the ratio between the amount of time that a minus 3 volts and a minus 11 volts is applied to lead 78 will determine the DC output of the averaging circuit. Transistor 85 is thus used as an inverter with the DC output of the averaging circuit being applied to the base of transistor 85. However, due to the inversion of the amplifier stage i.e. the transistor 85, the output from transistor 85 moves in an opposite direction. The increase in voltage on the base of transistor 85 tends to decrease the voltage on the collector thereof. Thus, with an increased voltage at the base of transistor 85, the voltage on lead 86 connected thereto will be reduced. Lead 86 connects with comparator 87, the quiescent state of which is normally maintained in the "on" condition by voltages applied by lead 86 when the magnetic responsive means is uniformally oscillating over the weld line.

Similarly, lead 79 connects with another averaging circuit identical to the one just described and has diodes 88 and 89. The output of this averaging circuit is directed to the base of transistor 90 which operates in a manner similar to transistor 85 and is also connected to another lead 91, which is connected to comparator 92. Comparators 87 and 92 correspond respectively with comparators 58 and 59 shown in FIG. 3.

Comparators 87 and 92 are respectively connected to drivers 93 and 94 which respectively operate relay switches 95 and 96, which respectively operate servo motor 21 in forward and reverse directions. The circuit may be provided with manual switches 97 and 98 for control purposes at a control panel. Comparators 87 and 92 are so connected through drivers 93 and 94 that there must be a reduced voltage to comparators 87 and 92 in order to operate relay switches 95 and 96 and thereby initiate action of motor 21. Thus, while the comparators 87 and 92 are normally in the "on" condition, drivers 93 and 94 are normally in the "off" condition and take inverted inputs. That is, with a minus 3 volts, they turned "off," but at minus 11 volts, they are turned "on."

Referring now to FIGS. 1, 2, and 4, relative movement of pipe 18 is effected through annular rings 13, and search shoe housing 34 is oscillated transversely across the weld line on the top of pipe 18. Hence, the magnetic responsive means in the search shoe housing 34 will be caused to follow a generally sinusoidal path along the weld line. The magnetic responsive means in this instance could be a search coil which would be responsive to the distortion in the magnetic field created in pipe 18, which distortion is caused by the weld line. The voltage generated each time the search shoe crossed over the weld line is applied to magnetic responsive input 72 shown in FIG. 4, which signal is amplified by amplifier 73 and applied to comparator 74.

Comparator 74 is normally set to be responsive to a preselected level, which level would normally be attained only by a voltage indicative of the search coil crossing over the weld line. The comparator then sets squaring amplifier 75, the purpose of which is to improve the rise time of the output signal of comparator 74. The output of squaring amplifier 75 is applied to the one-shot 76. The output of one-shot 76 is a broad pulse the duration of which is controlled by the external capacitor, which may be set at 1.0 microseconds, for example. Hence, the output of one-shot 76 is one broad signal for each crossing of the weld line by the search coil.

As explained above, successive outputs from one-shot 76 to flip-flop 77 cause it to be in the "set" and then the "reset" position. In the set position flip-flop 7 is arranged to apply two output voltages of different levels to leads 78 and 79. For example, the voltage on lead 78 might be minus 3 volts and on lead 79 the voltage might be minus 11 volts. In the reset position the voltages applied to lead 78 and 79 are reversed. If the search coil is uniformally oscillating back and forth across the weld line, the signals coming from one-shot 76 will be substantially uniform in time and hence the output from flip-flop 77 on leads 78 and 79, although opposite in polarity, will, for a given time span, be substantially even when averaged out. The signals applied on leads 78 and 79 will be received in the averaging circuits and respectively applied to transistors 85 and 90. As stated earlier, the two averaging circuits are identical and the output of the averaging circuits on transistors 85 and 90 will be substantially the same DC level so long as the search coil is centered over the weld line. When the scanning path of the search coil is so centered over the weld line, the voltages applied on leads 86 and 91 will be the same relatively high DC level. Since the quiescent level set on comparators 87 and 92 is such that they will normally be "on" when the scanning path of the coil is centered over the weld line, and since in this condition no signal is applied to drivers 93 and 94, the servo motor 21 will not be activated to either forward or reverse.

Now let it be assumed for example that the search coil contained in search shoe housing 34 goes off center such that the weld line is no longer under the center of the path followed by the search coil. In this instance, one-shot 76 would still be fired with each crossing of the search coil over the weld line but the intervals between successive signals would be changed. The result would be that the outputs to leads 78 and 79 would be different, resulting in a different DC voltage being applied to transistors 85 and 90. Therefore, depending upon which way the weld line had cambered, the voltage on lead 86 would be increased and the voltage on lead 91 decreased, or vice versa. For example, if the DC voltage applied to transistor 85 is increased, there would be a decrease in voltage on lead 86, thus causing comparator 87 to be turned off, which would activate driver 93, which would fire relay switch 95 (assuming that manual switch 97 were closed) thereby operating the servo motor 21 in a forward direction. With the servo motor 21 so operated, worm drive 20 would engage ring gear 19 and thereby rotate frame 16 to bring search shoe housing 34 back to a preselected or central position with respect to the weld line. Hence, the servo motor will be operated at such time as the difference in the voltages on leads 86 and 91 exceeds a preselected limit or level. Thus, it may be said that when the magnetic responsive means strays off of the weld line, one of the comparators 87 and 92 will be turned off, thereby actuating the driver connected thereto to operate the servo motor either in forward or reverse to once again position the magnetic responsive means in proper alignment with the weld line.

Thus by way of a summary, it may be said that the voltage applied to comparator 87, for example, must decrease to turn off comparator 87 and thereby turn on driver 93 to initiate the starting of servo motor 21 in the forward direction. The direction of camber of pipe 18 determines the direction in which servo motor 21 will be operated. When the path of the search coil is once again centrally positioned over the weld line, than there will be no output to the servo motor until there is further camber of the weld line to initiate a new turning action.

Occasionally the operation of the foregoing described circuit will become distorted or otherwise malfunction because of a spurious or extra signal which may be applied thereto and which is not truly representative of a signal created by the search coil or magnetic responsive means crossing over the weld line, in which instance flip-flop 77 may get out of phase. Hence, it is desirable, although not absolutely necessary, to apply a reset pulse to flip-flop 77 at specified intervals whereby the flip-flop is automatically set to a given state upon the receipt of the reset pulse. Thus, there is provided a synchronization signal which is applied to lead 101 through capacitor 102, to comparator 103, which operates reset generator 104, to apply a reset pulse to flip-flop 77 over lead 105.

Upon receipt of a reset pulse by flip-flop 77, it is immediately placed into a set position or given stage. This position will be selected to correctly correspond with the position of the search coil over the weld line.

The synchronization signal which is applied to lead 103 can be either produced by mechanical actuation, such as by a switch, or it could be produced by another magnetic responsive means. For example, a magnet could be mounted in cam wheel 31 with a coil mounted in housing 29 and adjacent to cam wheel 31 such that each time the magnet passed by the coil, a signal would be induced into the coil, which signal could be used as a synchronization signal. In either event, the signal generated should be selected so that it has a fixed relationship to the scan of shoe housing 34, so that the reset pulse will be applied at the correct point of the cycle of oscillation.

The portion of the electrical circuit just described and included within dotted line rectangle 106 corresponds with synchronization pulse shaper 107 in FIG. 3.

It is to be understood that all the plugins, that is, comparator 74, squaring amplifier 75, one-shot 76, flip-flop 77, comparator 103, reset generator 104, comparators 87 and 92, and drivers 93 and 94, all have plus or minus 12 volt connections in this particular embodiment. This voltage could be changed, depending upon the particular arrangement of each circuit and the components utilized therein.

Referring now to FIG. 3, a circuit will be described which includes those portions included within rectangles 50 and 51, which portions are shown in detail in FIG. 5.

In some instances, it is desirable to have an electrical circuit means which will operate more efficiently and accurately than the circuit shown in FIG. 4. For example, it is desirable to deactivate the tracking system when the search coil fails to pick up a signal with each crossing of the weld line or when only one signal is picked up in each oscillation. Since the correct operation of the tracking system depends upon picking up a signal with each crossing of the weld line, the operation of this apparatus will be erratic without such signals. In order to place the circuit out of operation when the search coil signals caused by the weld line are missing, or are of too low amplitude to operate properly, there is provided a lockout circuit generally designated as being included in rectangle 51 of FIG. 3.

Another problem encountered with the use of the circuit shown in FIG. 4 is that the signal produced by the magnetic responsive means varies over a wide range because of variation in the weld line. The variation in the signal can be in the form of amplitude and/or time width changes. These variations limit the range over which the circuit shown in FIG. 4 can operate. It is possible that in some instances two or more signals may be generated with each crossing which cause the system to give an unnecessary correcting response, thus resulting in erratic operation of the tracking system. Hence, that portion of the circuit enclosed within rectangle 50 of FIG. 3 has been added to permit operation over a wider range of variations in the weld line signal input.

It will be observed in FIG. 3 that a signal is taken from preamplifier 42 and applied to amplifier 64. The output of amplifier 64 is passed through automatic voltage control circuit 65, through diode 66, to isolation amplifier 67, to pulse shaper 52. Similarly, amplifier 64 is also connected through inverter 68, diode 69, to isolation amplifier 67. In addition, the output of amplifier 64 is passed directly through diode 70 to isolation amplifier 67. Diodes 66, 69, and 70 are all connected to common summing point 99.

FIG. 5 shows a circuit which includes the portions just described and in which preamplifier 110 corresponds with preamplifier 42 of FIG. 3, and into which a voltage from the flaw detector coil is applied. The output of preamplifier 110 is applied to amplifier 111, the output of which is utilized to operate a paint gun logic circuit or some other circuit. Output amplifier 111 is connected to preamplifier 110 through an appropriate gain control circuit, such as variable resistor 112. Lead 113 is connected to preamplifier 110 for supplying the flaw signal to a three stage amplifier included within the dotted rectangle indicated by the numeral 100 which corresponds with amplifier 64 of FIG. 3. Amplifier 100 has 3 transistors 114. The output of amplifier 100 is applied to diode 115, which connects with common summing point 116. The output of amplifier 110 is also applied to another unit indicated as the automatic voltage control (AVC) circuit included with the rectangle indicated by the numeral 117 and which corresponds with the AVC circuit 65 shown in FIG. 3. The output of amplifier 100 is also applied to an inverter indicated by the rectangle bearing numeral 118, having two transistors 119. The output of inverter 118 is applied to diode 120, which is also connected to common summing point 116. Similarly, the output of automatic voltage control 117 is applied to diode 121, which also connects to common summing point 116. Diodes 121, 115, and 120 respectively correspond with diodes 66, 70, and 69 of FIG. 3.

Common summing point 116 is then connected to an isolation amplifier indicated as being enclosed within the rectangle designated by numeral 122 and having transistors 123 therein.

The output of amplifier 122 is applied to comparator 131, to squaring amplifier 132, to one-shot 133, which respectively correspond to comparator 74, squaring amplifier 75, and one-shot 76, of FIG. 4, and which are generally designated as pulse shaper 52 shown in FIG. 3.

The output of one-shot 133 is fed into a lock-out circuit designated by that portion of the circuit included in the rectangle numbered 134 of FIG. 5 and will be referred to as the lock-out circuit and which corresponds with the lock-out circuit enclosed within rectangle 51 indicated in FIG. 3. The emitter of transistor 135 is connected to lead 136, which first connects with AND circuit 137, and subsequently connects with the base of transistor 138 through capacitor 139 and diode 140. The emitter of transistor 138 connects with comparator 141 which in turn is connected to inverter 142 which connects to another input lead of AND circuit 137. Capacitor 139 and diode 140 act as an averaging circuit or integrating type circuit and produce a DC voltage output which is relatively constant if the input is constant or the pulse rate of one-shot 133 remains constant. Again it should be remembered that the pulse rate from one-shot 133 is determined by the rate at which signals are received from the search coil, that is, each time the search coil crosses the weld line. The DC voltage output from this averaging or integrater circuit will be proportional to the number of signals that are received per unit of time. The DC voltage applied to comparator 141 will drop if an insufficient number of signals are picked up by the search coil and comparator 141 will be turned off, thus turning off or providing no ontput to inverter 142, which would thereby stop any output to the other input of AND circuit 137.

AND circuit 137 is the type of circuit which must have two inputs to have one output. When the only input is applied through lead 136 and not from inverter 142, then AND circuit 137 will have no output to flip-flop 143. The electrical circuit of the tracking system would thereby be locked out or blocked out. This would occur only if, for some reason, the search coil is not producing a voltage response with each crossing of the weld line. Thus, there is provided a safety feature whereby the tracking circuit will be placed out of operation if the apparatus becomes inoperative or in giving false responses, which would be the case if the search coil were not producing a voltage response each time it was passed over the weld line.

So long as there is a voltage response with each crossing of the weld line by the search coil, then comparator 141 will be operative and thus there will be two signals applied to AND circuit 137, with the result that there will be an output to flip-flop 143. The balance of the circuit from flip-flop 143 forward is the same as that described with respect to the circuit shown in FIG. 4. In other words, there are two averaging circuits fed by flip-flop 143 which respectively apply a D.C. voltage to the base of transistors 144 and 145, which control the operation of comparators 146 and 147, which respectively control the operation of drivers 148 and 149 and relay switches 150 and 151 to operate servo motor 21 in either a forward or reverse direction during weld line camber.

In operation amplifier 100 receives a signal from preamplifier 110 and amplifies the signal received or picked up by the weld line detector coil. The output of amplifier 110 is, as explained above, fed to AVC circuit 117, inverter 118, and diode 115. The purpose of inverter 118 is to take the negative portion of the A.C. signal at the output of amplifier 100 and invert it so that it will be of an opposite polarity such that at summing point 116 all of the signals will be of a positive polarity. The positive portion of the signal at the output of amplifier 100 goes directly through diode 115 to summing point 116. The output signal from amplifier 100 is also fed through AVC circuit 117 where it is integrated, i.e., there is a D.C. voltage provided which is proportional to the amount of signal coming in to AVC circuit 117.

AVC circuit 117 applies a reverse bias to summing point 116 such that if the general level of signals is high, there will be a D.C. voltage applied to summing point 116 through AVC circuit 117 which will limit the smallest amplitude of signals which can appear at summing point 116. In other words, if there is a given amount of signal voltage in the presence of a given amount of noise voltage, AVC circuit 117 can be adjusted so that ideally it provides a D.C. voltage at summing point 116 such that the noise does not appear as an A.C. signal and yet the full weld line signal does appear.

Thus, should the overall signal level of the weld line detector coil decrease, then the output from AVC circuit 117 also decreases such that the detector coil signal still appears at summing point 116. In other words, AVC circuit 117 acts as what might be called an "automatic grass cutter" and merely takes the top portion of the detector coil signals.

The purpose of the AVC circuit 117 is to provide a wider range of operation. The signals from the search coil vary in a number of ways either in the form of amplitude or time width as result of changes in the weld line. These variations ordinarily limit the range over which the tracking unit can operate and can cause erratic operation of the tracking system. AVC circuit 117 converts the weld line signal to a D.C. voltage which serves as a varying bias voltage at summing point 116. As this bias voltage increases due to an increase in amplitude and/or an increase in the pulse width of the weld line signal, a proportionally smaller amount of the peak amplitude of the weld line signal is allowed to pass through the logic portion of the weld line tracker. The converse holds true if the weld line signal becomes smaller in amplitude and/or smaller in pulse width. With this increase in the operating range a more reliable tracking system is provided.

From summing point 116, the weld line signal is feed through isolation amplifier 122 the purpose of which is to provide an emitter follower stage which drives comparator 131.

Thus, the art has been provided with a novel weld line tracking apparatus which can be used in combination with an apparatus for performing a work operation on a pipe having a weld line therein, and which will keep the work means, such as a search coil, correctly positioned with respect to the weld line.

While we have described the magnetic responsive means as being a search coil which is responsive to variations in the flux pattern of the magnetic field caused by the weld line, it is to be understood that other magnetic responsive means such as an eddy current device could be used for sensing the weld line. Nevertheless, both embodiments will be considered as having established a magnetic field in the pipe. In the case of an eddy current device or unit, the means for establishing the magnetic and the magnetic responsive means would be the same. When the magnetic responsive means is a search coil which is responsive to variations in a magnetic field established by a magnet then the search coil may also be the work means whereby the weld line is inspected for defects.

The circuit shown in FIG. 5 also has a synchronization pulse shaper circuit enclosed in the box designated by the numeral 152, the operation of which is identical to synchronization pulse shaper circuit 106 shown in FIG. 4 and is connected to flip-flop 143 in the same manner that circuit 106 is connected to flip-flop 77.

*Technical references*

The electrical components or units utilized in the foregoing circuits are well known to those skilled in the art and are readily available to the industry.

Comparators 58, 59, 74, 87, 92, 103, 131, 141, 146 and 147 are all of the same type and are shown in Catalogue T72, entitled Digital Circuit Modules, published by Engineered Electronics Company, 1441 E. Chestnut Ave., Santa Ana, Calif., Unit T172, page 24. A similar comparator is shown in the book entitled Selected Semi-conductor Circuits Handbook, by Seymour Schwartz, published by John Wiley and Sons, Inc., 1960, page 6–55, circuit number 6–18.

Squaring amplifiers 75 and 132 are of the same type and are shown as Unit T–106, page 20 of Catalogue T72 referred to above. These may be Schmitt trigger type circuits, and hence could be the same as the comparators referred to above and be similar to circuit number 6–18, page 6–55 of Selected Semi-conductor Circuits Handbook referred to above.

One-shots 76 and 133 are the same and are shown as Unit T–166, page 58, of Catalogue T72 referred to above. They are similar to the circuit shown on page 6–50 of Selected Semi-conductor Circuits Handbook referred to above.

Flip-flop circuits 53, 77 and 143 are the same and are T input flip-flops and shown as Unit T–643, page 35, of Catalogue T72 referred to above. They are similar to the circuit shown in the book entitled Transistor Logic Circuits by Richard B. Hurley, published by John Wiley and Sons, 1961, page 316, FIGS. 11–19. A similar circuit is also shown on page 6–37 of Selected Semi-conductor Circuit Handbook referred to above.

Drivers 60, 62, 93, 94, 148, and 149 are the same and are shown as Unit T–130, page 28 of Catalogue T72 referred to above. A similar circuit is shown in Preferred Circuits Handbook, vol. II, Navy Weapons Dept., Dept. of Navy, U.S. Government, April 1, 1962 (NAVWERS 16–1–519–Z), page 12–2.

AND circuit 137 is of the type illustrated in the book entitled Pulse and Digital Circuits, by Millman and Taub, published by McGraw-Hill, 1956, page 398, FIG. 13–8.

Further modifications may be made in the invention as particularly described without departing from the scope of the invention. Accordingly, the foregoing description is to be construed illustratively only and is not to be construed as a limtation upon the invention as defined in the following claims.

What is claimed is:

1. In combination with an apparatus for performing a work operation on a magnetizable member moving relatively thereby and having an anomaly which extends generally parallel with the direction of said relative movement and which anomaly is subject to variation in directions transverse to said relative movement and which apparatus has oscillation means mounted on a support means for transversely oscillating a work means over said anomaly during said relative movement, the improvement for causing said oscillations to be uniform in relation to said anomaly, including times when said anomaly varies in said transverse directions, said improvement comprising:

a movable frame mounted on said support means and supporting said oscillation means, means for establishing a magnetic field in a portion of said magnetizable member and through said anomaly, magnetic responsive means mounted on said oscillation means for oscillation therewith over said anomaly and producing a first voltage as an incident of each crossing of said magnetic responsive means over said anomaly, a first comparator circuit connected to said magnetic responsive means and adjusted to produce an output when said magnetic responsive means produces a first voltage above a preselected level, a flip-flop circuit connected to said first comparator and having two output voltages of different levels and adapted to alternately apply said output voltages to two leads as an incident of successive inputs from said first comparator, electrical circuit means for averaging the output voltages received from said flip-flop circuit and applying said averaged output voltages to alternately operate a motor in forward and reverse directions when said averaged output voltages vary beyond preselected limits, said motor being connected to move said movable frame transversely with respect to said anomaly.

whereby said work means is moved to a preselected position with respect to said anomaly when said motor is operated in forward and reverse directions as said anomaly alternately varies in said transverse directions.

2. The apparatus as claimed in claim 1, wherein.

said electrical circuit means includes first and second channels, each channel having,
- a voltage averaging circuit connected to one of said leads which are connected to said flip-flop circuit,
- a second comparator connected to said averaging circuit, and
- switch means connected to said second comparator to operate said motor in a preselected direction.

3. The apparatus as claimed in claim 1 including:

an electrical lockout circuit connected between said first comparator and said flip-flop circuit and providing an input to said flip-flop circuit only when said first comparator produces two output signals with each cycle of oscillation of said magnetic responsive means.

4. The apparatus as claimed in claim 1, including:

an automatic voltage control circuit connected between said magnetic responsive means and said first comparator.

5. The apparatus as claimed in claim 1 including:

a synchronization means for applying a reset pulse to said flip-flop circuit at a preselected point in each oscillation of said magnetic responsive means.

6. In combination with an apparatus of the type for performing a work operation on a pipe having a weld line therein, which weld line is subject to camber as said pipe is moved relative thereto, said apparatus including oscillation means mounted on support means for transversely oscillating a work means over said weld line during said relative movement, the improvement for causing said oscillation to be uniform in relation to said weld line when said weld line cambers comprising:

a rotatable frame mounted on said support means and supporting said oscillation means, means for establishing a magnetic field in a portion of said pipe and said weld line, magnetic responsive means mounted on said oscillation means for oscillation therewith over said weld line and producing a first voltage as an incident of each crossing of said magnetic responsive means over said weld line, a first comparator circuit connected to said magnetic responsive means and adjusted to produce an output when said magnetic responsive means produces a first voltage above a preselected level, a flip-flop circuit connected to said first comparator and having two output voltages of different levels and adapted to alternately apply said output voltages to two leads as an incident of successive inputs from said first comparator, electrical circuit means, including a voltage averaging circuit connected to each of said leads, for averaging the voltages received on said leads and applying said averaged voltages to alternately operate a motor in forward and reverse directions as said averaged voltages vary beyond preselected limits, said motor being connected to rotate said rotatable frame circumferentially with respect to said pipe, whereby said work means is moved to a preselected position relative to said weld line when said motor is operated in forward and reverse directions as said weld line cambers.

7. The apparatus as claimed in claim 6 wherein:

said work means is a magnetic inspection device for detecting flaws in said weld line.

8. The apparatus as claimed in claim 6 wherein:

said work means and said magnetic responsive means is a flaw detecting coil, whereby said weld line is inspected for defects.

9. The apparatus as claimed in claim 6 wherein:

said electrical circuit means also includes:
- a second comparator connected to each of said averaging circuits, and
- a relay switch connected to each of said second comparators to operate said motor in preselected directions.

10. The apparatus as claimed in claim 6 including:

an electrical lockout circuit connected between said first comparator and said flip-flop circuit and providing an input to said flip-flop circuit only when said first comparator produces two output signals with each cycle of oscillation of said magnetic responsive means.

11. The apparatus as claimed in claim 6 including:

an automatic voltage control circuit connected between said magnetic responsive means and said first comparator for controlling the level of voltage applied to said first comparator.

12. The apparatus as claimed in claim 6 including:

a synchronization circuit connected to said flip-flop circuit and adapted to apply a reset pulse thereto at a preselected point in each oscillation of said magnetic responsive means.

13. The apparatus as claimed in claim 6 wherein:

said work means is a magnetic inspection device for detecting flaws in said weld line.

14. The apparatus as claimed in claim 6 wherein:

said work means and said magnetic responsive means is a flaw detecting coil, whereby said weld line is inspected for defects.

15. In combination with an apparatus of the type for inspecting pipe having a weld line therein, which weld line is subject to camber as said pipe is moved relative thereto, said apparatus including oscillation means mounted on support means for transversely oscillating a magnetic responsive means over said weld line during said relative movement, the improvement for causing said oscillation to be uniform in relation to said weld line at all times comprising:

a rotatable frame mounted on said support means and supporting said oscillation means, means for establishing a magnetic field in a portion of said pipe and said weld line, magnetic responsive means mounted on said oscillation means for oscillation therewith over said weld line and producing a first voltage with each crossing of said magnetic responsive means over said weld line, a first comparator circuit connected to said magnetic responsive means and adjusted to produce an output when said magnetic responsive means produces a first voltage above a preselected level, a flip-flop circuit connected to said first comparator and having two output voltages of different levels and adapted to alternately apply said output voltages to two leads as an incident of successive inputs from said first comparator, two voltage averaging circuits, each of which is connected to one of said leads, two second comparators, each of which is connected to one of said averaging circuits, two switch means, each of which is connected to one of said second comparators, a servo motor operated in forward and reverse directions by said switch means and connected to rotate said rotatable frame circumferentially with respect to said pipe during operation, and a synchronization circuit connected to said flip-flop circuit and adapted to apply a reset pulse thereto at a preselected point in each oscillation of said magnetic responsive means.

References Cited

UNITED STATES PATENTS

| | | | |
|---|---|---|---|
| 2,519,367 | 8/1950 | Gunn et al. | 324—40 |
| 2,877,406 | 3/1959 | Hochschild | 324—40 |
| 2,980,848 | 4/1961 | Datt et al. | 324—37 |
| 3,017,496 | 1/1962 | Greene | 219—124 |
| 3,152,302 | 10/1964 | Allen et al. | 324—34 |
| 3,179,786 | 4/1965 | Greene | 219—125 |
| 3,268,805 | 8/1966 | Normando | 324—37 |

FOREIGN PATENTS 694,530    8/1940    Germany.

RUDOLPH V. ROLINEC, *Primary Examiner.*

S. B. GREEN, *Assistant Examiner.*

UNITED STATES PATENT OFFICE
CERTIFICATE OF CORRECTION

Patent No. 3,346,807                                October 10, 1967

Fenton M. Wood et al.

It is hereby certified that error appears in the above numbered patent requiring correction and that the said Letters Patent should read as corrected below.

Column 3, line 22, after "a" insert -- size --; line 54, for "lower" read -- lowered --; column 4, line 9, strike out "of operation"; line 46, for "as" read -- is --; line 51, for "minum" read -- minus --; column 5, line 54, for "7" read -- 77 --; column 6, line 43, for "than" read -- then --; column 7, line 23, for "erractic" read -- erratic --; column 8, line 42, for "ontput" read -- output --; line 54, for "in" read -- is --; column 9, line 46, for "feed" read -- fed --; column 10, line 49, for "limtation" read -- limitation --.

Signed and sealed this 29th day of October 1968.

(SEAL)
Attest:

Edward M. Fletcher, Jr.　　　　　　　　　　　　EDWARD J. BRENNER
Attesting Officer　　　　　　　　　　　　　　　Commissioner of Patents